Sept. 24, 1935.  H. M. STADT  2,015,242
METHOD OF MANUFACTURING PRODUCTS FROM COTTON SEED SOLIDS
Filed March 6, 1933
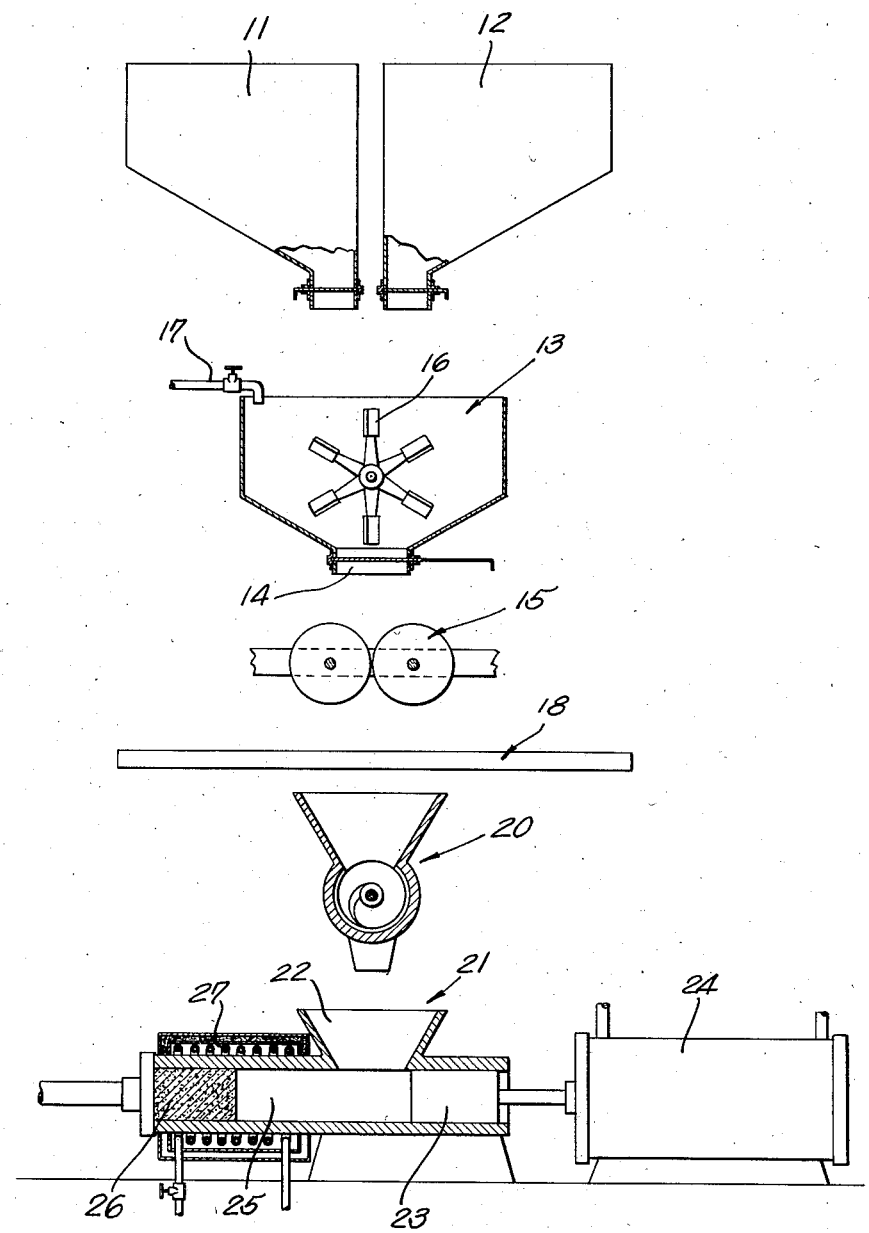
INVENTOR:
HENRY M. STADT,
By
ATTORNEY.

Patented Sept. 24, 1935

2,015,242

UNITED STATES PATENT OFFICE 2,015,242

METHOD OF MANUFACTURING PRODUCTS FROM COTTON SEED SOLIDS

Henry M. Stadt, Glendale, Calif., assignor, by mesne assignments, to Refining, Inc., Reno, Nev., a corporation of Nevada Application March 6, 1933, Serial No. 659,690

3 Claims. (Cl. 18—47.5)

My invention relates to a product comprising a protein and a method of manufacturing the same.

The protein content of cottonseed, which is relatively large, is carried in the cellular structure of the seed in such a manner that the protein content is not readily available owing to the protective coating of cellulose material with which the protein particles are covered. In my invention the entire protein content of cottonseed, cottonseed meal, or cottonseed hulls is released so that it is thereafter available for nutritive and other uses as hereinafter fully set forth.

The essence of my invention may be readily perceived from the following description of a preferred practice thereof, in which the product is of such characteristics and form that it may readily replace phenol-condensation products in many of their uses. For example, these phenol-condensation products, now generally recognized by the trade-name "Bakelite", are employed in the making of sheet material for electrical devices, for molded objects of various kinds, such as knobs, handles, and brackets, for use in electrical devices, and in other various manners. In the preferred practice of my invention I am able to produce from cottonseed a substance having many of the characteristics of phenol-condensation products at a very material reduction in cost. I find that cottonseed meal, which is now essentially a by-product, has a protein content of substantially forty-five percent and that cottonseed hulls have a small protein content, and that this protein content together with the remaining fibrous or vegetable content may be transformed from its natural characteristics and made into dense bodies having dielectric qualities approaching that of condensation products and having physical strength enabling their use in place of articles made from condensation products, hard rubber, etc.

In the above preferred practice of the invention the protein from the cottonseed hulls may alone be used, or this protein may be employed in conjunction with various other filler materials such as the vegetable content of cottonseed meal other than the protein, cottonseed hulls, vegetable fibers such as sawdust or straw, or earth substances such as sand, clay, or asbestos. Since the protein of casein-like matter and the filler substance are found together in cottonseed, I find that my invention may be practiced by use of cottonseed alone without the addition of other filler materials, and preferably after the oil has been pressed from the cottonseed meal, since such oil has a commercial value and is not essential to the practice of the invention. The simple manner of making the preferred product consists in macerating cottonseed meal, with or without cottonseed hulls, mixing the same with a solvent for the protein content of the cottonseed substances, and kneading the mixture until the fibrous or cellular structure of the cottonseed meal and hulls is entirely disintegrated and a homogeneous glutinous mass having the appearance of raw rubber is formed. This homogeneous material, which is translucent in character, is then dried and ground to essentially powder form, quantities of which powder are then compacted to form bodies of the desired configuration, such as sheets, spools, handles, etc.

Any casein-like protein may be treated in the manner set forth in the foregoing paragraph with the result of producing a product having essentially the same characteristics. Where a fine grain structure is desired and a high surface polish is to be attained, the protein, such as cottonseed protein, alone is used, or the same is used in conjunction with a filler having the desired characteristics. Where a cellular grain structure, as in sheets for sound insulation, is desired, a filler of cellular characteristics may be mixed with the homogeneous protein or protein and filler mass produced by kneading.

At an intermediate step of the above discussed practice of my invention, a food product having a large protein content is obtained in which the protein is released from the cellular structure of the cottonseed substance so that it is available for food purposes. For example, a greater portion of the forty-five percent protein content of cottonseed meal is contained within the minute cells formed of cellulose material so as to be protected from digestive action, with the result that digestion is retarded and a part of the protein remains undigested. In the practice of my invention, a solvent, preferably clear water, is mixed with cottonseed material, preferably cottonseed meal, to form a plastic mass, which plastic mass is then milled with a pronounced kneading action to break down the cellular structure, thereby exposing or releasing the protein content so that it is dissolved in the water. Due to the kneading action, the cellular structure is broken down to such an extent that it may be nearly or entirely imperceptible to visual inspection. The kneading or milling action may be carried to such a point that the cellular structure is broken and the protein is thereby released, or the kneading action may be carried to such an extent that the cellulose material is so finely divided that the milled mass of material is entirely clear. The milled mass of material thus obtained has the protein content entirely released and in a pre-digested condition so as to be available for animal and human consumption. The finely divided cellulose content of the food material thus formed provides a bulk or mass which will contribute to a satisfactory peristaltic action. For food uses the milled mass is, as hereinbefore described, taken from the mill in sheets which are permitted to dry and are then decimated, being either ground to relatively fine form or cut into narrow strips or noodles.

An investigation of the nutritive values of the protein content of cottonseed by comparative feeding of white rats with such cottonseed protein and other protein shows that cottonseed protein has a growth-promoting value very near to that of casein obtained from milk. Accordingly, the food product hereinabove described may be satisfactorily used in place of milk where other vitamine containing foods are also consumed in order to provide the necessary vitamines.

Further objects and advantages of the invention will be made evident throughout the following part of the specification.

In the drawing, which is a diagrammatic view indicating a type of apparatus which may be employed in making the product, I show hoppers 11 and 12 disposed above a mixer 13 having a gate 14 adapted to discharge into a kneading device 15 which may consist of cylindrical rollers such as used in the rubber industry for milling rubber. From the hoppers 11 and 12 a cottonseed protein or a material containing a large quantity thereof, such as cottonseed meal, is discharged into the mixer 13 which has paddle means 16 for mixing the dry material with a protein solvent fed into the mixer 13 from piping 17. This solvent may be plain water or may be an acid or alkaline solution, depending upon characteristics desired. In the mixer 13 a plastic mass is formed, quantities of which are delivered through the gate 14 to the kneader 15 where it is subjected to a very thorough disintegrating action, either heated or cold, by reason of the fact that the particles of material entering into the plastic mass are, due to the rolling action produced in the kneader, brought forcibly together and are caused to move relatively in frictional engagement while so forced together, this breaking down the cellular or fibrous structure so that a homogeneous mass of material is formed in the kneader which is somewhat translucent and has about the same color as raw rubber during the time it is being milled in a rolling device of the same character.

If a filler material is to be used, such, for instance, as cottonseed hulls or the various other fillers hereinbefore mentioned, it may be delivered from the hopper 12 into the mixer 13 to be therein mixed with the protein material from the hopper 11 and solvent from the piping 17. If it is not desired to fully break down the cellular structure of the hulls or other filler materials employed, the protein material may be mixed with the solvent to form a plastic mass, and this mass may be partly milled or fully milled before it is mixed with the filler material, and then the admixture containing the milled protein substance and the filler substance may be further milled to produce a thorough intermixture of the ingredients.

The essentially homogeneous mass produced by the milling of protein or protein material, with or without addition of a filler material, is then taken from the kneader or mill 15 to a drying means 18 of any desired character where the moisture is removed from the sheets so that they become hardened. Then, by means of a grinder 20, the dried material is reduced to powdered form, the size of the particles depending upon the characteristics of the products to be made from the material. Ordinarily, good results will be obtained where the material is ground to such size that it will pass through screen from 40 to 60 mesh.

The powdered material is then compacted to solid body form, such as sheets, slabs, or bodies of any desired configuration such as may be produced in molds. For the purpose of illustration I show a press 21 having a mouth 22 into which the powdered material is delivered. By use of a ram or plunger 23 operated by a hydraulic cylinder and piston mechanism 24, the material is forced into a space 25 so as to form a body thereof as indicated at 26. While under pressure of the ram 23, the body 26 is heated, as by means of a steam coil 27. Under average conditions the body 26 may be given a desired density, physical strength, and electrical characteristics where it is subjected to a pressure of substantially two thousand pounds for a period of fifteen minutes, and during this time is maintained at a temperature of approximately 250° F. The use of heat is not necessary to the forming of the molded bodies, for the compacting of the material may be accomplished by increasing the molding pressure. Greater economy is maintained, however, by use of heat, for then a minimum pressure may be employed.

Where cottonseed hulls are employed without added quantities of cottonseed protein or cottonseed meal, it will be generally necessary to add some sort of binder such as glue, gelatine, or resinous material, or, instead of these materials, a binder may be employed consisting of a casein-like protein obtained from other sources. In the ordinary practice of the invention, however, cottonseed protein is employed, since it is extremely sheap as a result of being a by-product of the cotton industry.

As an example of the utility of the invention, it may be stated that from cottonseed meal, with or without added quantities of cottonseed hulls, a molded product or products may be obtained which have many utilities. For example, the product may be made in slab form to be used as panel boards or bases for electrical instruments and switches, and may be molded to form knobs or insulator brackets or supports in electrical devices and switches. The product has not quite the dielectric strength found in phenol-condensation products and therefore cannot be used in place of the same in every instance, but where high voltage conditions are encountered, the thickness of the molded parts may be increased to give the required dielectric strength. Furthermore, the use of my new material will constitute a large saving by reason of the fact that the raw materials entering into the product may at the present time be obtained at a cost substantially one-tenth the cost of materials entering into phenol-condensation products, and the molding operations may be conducted in approximately one-tenth the time required for molding of phenol-condensation products. Phenol-condensation products require the application of heat and pressure for periods of time extending from one to three hours, whereas the molding and curing of my material are ordinarily accomplished in a period of fifteen minutes.

Due to the presence of dye in the cottonseed material in its natural state, the product varies in color from dark brown to black. By removal of the dye from the cottonseed material, a product of gray color is produced. The addition of various pigments may be employed to produce various other colors.

The product has many uses other than with electrical devices and products, and its characteristics may be changed to particularly suit the various uses by employing therein materials which will contribute to these valuable characteristics. For instance, synthetic resins, natural resins, gelatine, glue, and agar-agar may be added. The grain structure of the product may be controlled in accordance with the uses of the product by a proper selection of fillers. For example, if the product is to be used for phonograph records, a fine grain structure will be desired, and filler materials will be selected which will produce a product having the desired fine grain and being capable of taking a high polish; but where the product must have pronounced physical strength, hard and strong filler materials, such as sand or silica, are employed.

Where the product from the kneading device 15 is to be used for food purposes, clean cottonseed material is delivered into the mixer 13 where it is mixed with a solvent of non-injurious character. This solvent may, in the general practice of the invention, be clear water, or it may be water with a slight acid or alkaline content. For human consumption it is preferable to use only the cottonseed meal from which a part of the oil has been pressed. For animal feeding some content of cottonseed hulls may be employed, but ordinarily it is preferable to use merely the cottonseed meal. The kneaded material obtained in this manner may be also used for molding purposes after being dried and ground to the desired size.

As hereinbefore stated, the cellular material having protein trapped in the cells thereof may, as hereinbefore described, be treated by milling or kneading so as to break down the cellulose walls of the cells whereby to release the protein from the cells; but it is also a feature of my invention to facilitate the releasing action by first treating the cellular material so as to soften or partly break down the walls thereof. This I do prior to the kneading or milling action by cooking the mixture for a period which may be as long as two hours. The releasing action is also facilitated by the addition of an acid or alkali to the solution or to the water with which the cellulose-protein material is mixed. In the preferred practice of the invention sulphurous acid is added to the water to a strength of ten percent of an eight percent $SO_2$ solution. The action of the sulphurous acid is one of hydrolysis, and the carbohydrates and the lignin are acted upon, only a small part of the cellulose being destroyed. The sulphurous acid acts principally upon the lignin which is contained with the cellulose in the cell walls, thereby reducing the physical strength of the cell walls to such an extent that the proteins are freed by a relatively short period of milling.

In each of the foregoing described embodiments of my invention I have taken a material having a cellular structure containing protein therein, and have released the protein so that it may be usefully employed, the only difference being that where the protein product produced by the kneading device 15 is to be employed for food purposes, no substances are employed which are harmful or are not suited for introduction into the digestive tract. It will be perceived from the foregoing that I have not taken the protein elements out of the meal and then used them as a binder for other fillers, but have simply put the protein elements in an available form in the original mass and have utilized them without separation from the cellulose material. It is already known and practiced that a certain percentage of proteins can be extracted from cottonseed meal and from other meals produced from oil bearing seeds by digestive methods, this protein making a glue of exceptional quality. I believe, however, that only a certain percentage of this protein, far below the actual protein content of the meal, is successfully removed by the known digesting and solvent means. In my invention all of the protein content of the meal is made available for use. My process, applied to vegetable oil meals intended for cattle feeding, releases the protein from the cellular structure so that the animal eating the same gains the benefit of essentially the full protein content of the meal.

By the term "cotton seed solids" as used in the claims is meant whole cotton seeds, cotton seed meal, cotton seed hulls, or the like, as distinguished from cotton seed liquids per se. That is, this term excludes such liquids as cotton seed oil used alone but does not exclude solids containing small portions of such liquids.

Although I have herein shown and described my invention in simple and practical form, it is recognized that certain parts or elements thereof are representative of other parts or elements which may be used in substantially the same manner to accomplish substantially the same results; therefore, it is to be understood that the invention is not to be limited to the details disclosed herein but is to be accorded the full scope of the following claims.

I claim as my invention:

1. A method of making a formed product capable of replacing formed phenolic condensation products for many purposes, which comprises: preparing a substantially homogeneous mass from cotton seed solids having substantially the original protein content solely by mechanically kneading said solids in the presence of a solvent for said protein; drying the mass resulting from said kneading; reducing the dried mass to a divided material; and compacting a quantity of said divided material under heat and pressure to form a relatively dense body.

2. A method of making a formed product capable of replacing formed phenolic condensation products for many purposes, which comprises: preparing a substantially homogeneous mass from cotton seed solids having substantially the original protein content together with a filler solely by mechanically kneading said solids in the presence of a solvent for said protein; drying the mass resulting from said kneading; reducing the dried mass to a divided material; and compacting a quantity of said divided material under heat and pressure to form a relatively dense body.

3. A method of making a formed product capable of replacing formed phenolic condensation products for many purposes, which comprises:

preparing a substantially homogeneous mass from cotton seed solids having substantially the original protein content together with a filler and a binder solely by mechanically kneading said solids in the presence of a solvent for said protein; drying the mass resulting from said kneading; reducing the dried mass to a divided material; and compacting a quantity of said divided material under heat and pressure to form a relatively dense body.

HENRY M. STADT.